United States Patent [19]
Conrow et al.

[11] Patent Number: 5,526,409
[45] Date of Patent: Jun. 11, 1996

[54] ADAPTIVE COMMUNICATION SYSTEM WITHIN A TRANSACTION CARD NETWORK

[75] Inventors: Paul W. Conrow, Danville; Kevin J. McHale, Redwood City; Paul M. Bartell, San Mateo; John L. Prempas, Pleasanton, all of Calif.

[73] Assignee: Visa International Service Association, Foster City, Calif.

[21] Appl. No.: 142,776

[22] Filed: Oct. 26, 1993

[51] Int. Cl.⁶ ................................................ H04M 11/00
[52] U.S. Cl. ........................... 379/91; 379/93; 364/401
[58] Field of Search .......................... 379/90, 91, 93, 379/94, 96–99; 364/401, 408; 370/3; 235/382.5

[56] References Cited

U.S. PATENT DOCUMENTS 4,972,463  11/1990  Danielson et al. .................... 379/91
5,144,651   9/1992  Cooper .

OTHER PUBLICATIONS

Advertisement published by Datacap Systems, Inc. (date unknown) disclosing a communication processor called TransIT.

*Primary Examiner*—Wing F. Chan
*Attorney, Agent, or Firm*—Hecker & Harriman

[57] ABSTRACT

The present invention is a point-of-presence device installed in a merchant establishment as an interface between a retail information system and a transaction card authorization network. By using a simple message data format between the retail information system and the device, the device insulates the retail information system from changes to local communication access methods and changes to point-of-sale compliance requirements initiated by the card processor. The device first establishes a dial-up telephone connection to the authorization network and then interleaves both financial data messages and non-financial messages over the same telephone line to the authorization network. The device provides authorization response times that substantially equal response times provided by leased line connections to the authorization network. In addition, the present invention provides improved diagnostic and draft capture capability for the retail information system.

23 Claims, 10 Drawing Sheets

ADAPTIVE COMMUNICATION SYSTEM WITHIN A TRANSACTION CARD NETWORK

BACKGROUND OF THE INVENTION

The present invention relates to an adaptive communication system within a transaction card network for processing electronic payments.

In one approach for processing electronic payments, merchants and retailers utilize a dial terminal located at each checkout counter or electronic cash register (ECR) within the retail store to communicate to an authorization network. In large stores, many retailers have opted to eliminate stand-beside dial terminals in favor of a workstation/processor controller configuration with integrated card swipe and printer functions. In this approach, the ECRs are linked to a processor controller or in-store processor (ISP) using a local area network (LAN) forming a retail information system. The processor controller is then used as a dial terminal emulator and provides the interface to the authorization network, usually using a dial-up access method. As such, it performs functions such as message formulations, data capture and management of the interface between the ISPs and the authorization network.

Regardless of the configuration, actual dial terminal or emulated dial terminal (software in back room systems), there are several drawbacks in obtaining authorization service. First, the service from credit card networks is no better than the service provided to single-location retail establishments. Most transaction authorization networks that offer dial-up services are designed to serve the actual dial terminal. The dial terminal is a single user device. Currently, the transactions that are entered into authorization networks by expensive, sophisticated retail information systems represent the work done at multiple point-of-sale processors within the store. The authorization networks, however, treat those transactions on a one-at-a-time basis which is identical to those that are entered through stand alone dial terminal devices.

For example, assume an ISP or electronic cash register, ECR A, requests a transaction authorization. The processor controller dials the credit network and transmits ECR A's request. Assume further that ECR B requests an authorization. The ECR controller holds this second request until the first request has been returned. Once ECR A's request is returned, ECR A can complete the sale. The controller then sends ECR B's request and this second transaction is completed once the response is returned. Note that although no redialing is necessary to service ECR B's request, ECR B still had to wait for ECR A to be serviced. In busy stores, with many workstations and many customers standing in line, the processor controller or back room system manages a queue of requests waiting for authorization service. To the authorization network, this type processor controller configuration appears to be a single-user dial terminal device.

A second problem with the many ECR configurations is that the processor controller contains the communication interface to the outside world, which must be constantly updated. During the past decade, electronic payment transactions have benefitted in many ways from the improvements in local access technology and the deregulation of the telephone services.

One such improvement is known as Feature Group B (950) service, which is an efficient and cost effective dialing alternative. Another improvement is data/voice multiplexing technology which is capable of carrying both voice and data on the same physical telephone line. Integrated Services Digital Networking (ISDN) capabilities are emerging and should become common by the end of the decade. Satellite technology delivered to the point-of-sale is also showing some success.

Each local access technology alternative has its own distinct communications interface methods and requires that retailers write new communication software modules to utilize the new technology. This is potentially an expensive proposition which must, each time, be carefully considered and justified before retailers commit the necessary resources.

Such problems are even greater for stores that have a large number of retail locations spread all over the country. All communications alternatives are not going to be available in all of the retail store locations. Multiple sets of communications software within the store systems will have to be maintained and managed. This may not be burdensome for a 50 store chain but it will be very difficult for a national retailer to maintain software at 300 locations, for example.

A third problem is that in many ECR configurations, it is difficult to trace errors or transaction processing delays to and from the authorization network. The problems may occur in the ECRs, the processor controller, or the communication path to the authorization network. With current configurations, diagnostic functions are either inadequate or non-existent.

Moreover, transaction card service providers periodically change their communication requirements for point-of-sale (POS) devices. Each communication requirement has its own purpose in fighting fraud, controlling processing costs and reducing risk in electronic payments. Modifying a large number of POS devices to conform to a new, or enhanced, set of requirements is expensive and bothersome to merchants. Each improvement requires updates in the retailer's ISP software. In some instances, the service provider must then certify those modifications before allowing the merchants access to the transaction card authorization network.

Therefore, it would be desirable to provide a system which affords faster transaction authorization service, provides a transparent interface to improvements, or differences, in local access telecommunications techniques, provides improved performance monitoring and error reporting, and eliminates the need for retailers to modify ISP communication software to respond to new POS compliance requirements.

SUMMARY OF THE INVENTION

Accordingly, it is an object of the present invention to provide an adaptive communication system within a transaction card authorization network.

The present invention is a point-of-presence device installed in a retail or mail order establishment as an interface between a retail information system and a transaction card processor. The present invention transfers data between the retail information system and the transaction card processor through an authorization network. The retail information system includes a plurality of processing devices linked to a processor controller where the processor controller normally executes a particular software application. The transaction card processor has responsibility for network services including network access methods and point-of-sale compliance requirements.

The present invention includes communication means for controlling the transfer of data between the processor controller and the authorization network. The communication means includes means for interfacing with the processor controller and means for establishing communication with the authorization network through a dial-up telephone connection. The communications means insulates the retail information system from changes to the network access methods, and from changes to the point-of-sale compliance requirements, independent of the particular software application executing on the processor controller.

The present invention also includes means for establishing a dial-up telephone connection to a host computer for communication between the processor controller and the host computer. In accordance with the present invention, the communication means is capable of processing and transferring financial data messages concurrently with the non-financial data messages.

One primary function of the present invention is to process authorization requests from the retail information system and obtain responses back from the authorization network. The present invention obtains authorization responses from the Authorization host in a dial-up environment in times substantially equal to that provided by leased lines using the following techniques. Once an authorization request is received, a fast connection is established to the authorization network (if one does not exist), using predial means, rapid dial means, and fast modem handshaking means. Once a connection to the network is established, the present invention includes means for holding the connection open while more requests are pending and means for processing the transactions independently of one another.

In one preferred embodiment, the communication means includes means for collecting and storing service quality data independent of the particular software application executing on the processor controller for diagnostic and performance reporting. The communication means further includes software and parameters means for interfacing with a remote help desk facility. The help desk includes means to submit financial transactions to the communication means for transmission to the authorization network for performance monitoring, means to download software and parameters to the communication means, and means to interrogate the service quality data of the communication means.

The communication means further includes a draft capture means for maintaining multiple capture groups and multiple settlement batches concurrently and administrative terminal interface means for reviewing, adjusting, and releasing batches independently.

Other objects, features and advantages of the present invention will become apparent from the following detailed description when taken in conjunction with the accompanying drawings.

BRIEF DESCRIPTION OF THE DRAWINGS

The accompanying drawings, which are incorporated in and form a part of this specification, illustrate embodiments of the invention and, together with the following detailed description, serve to explain the principles of the invention.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
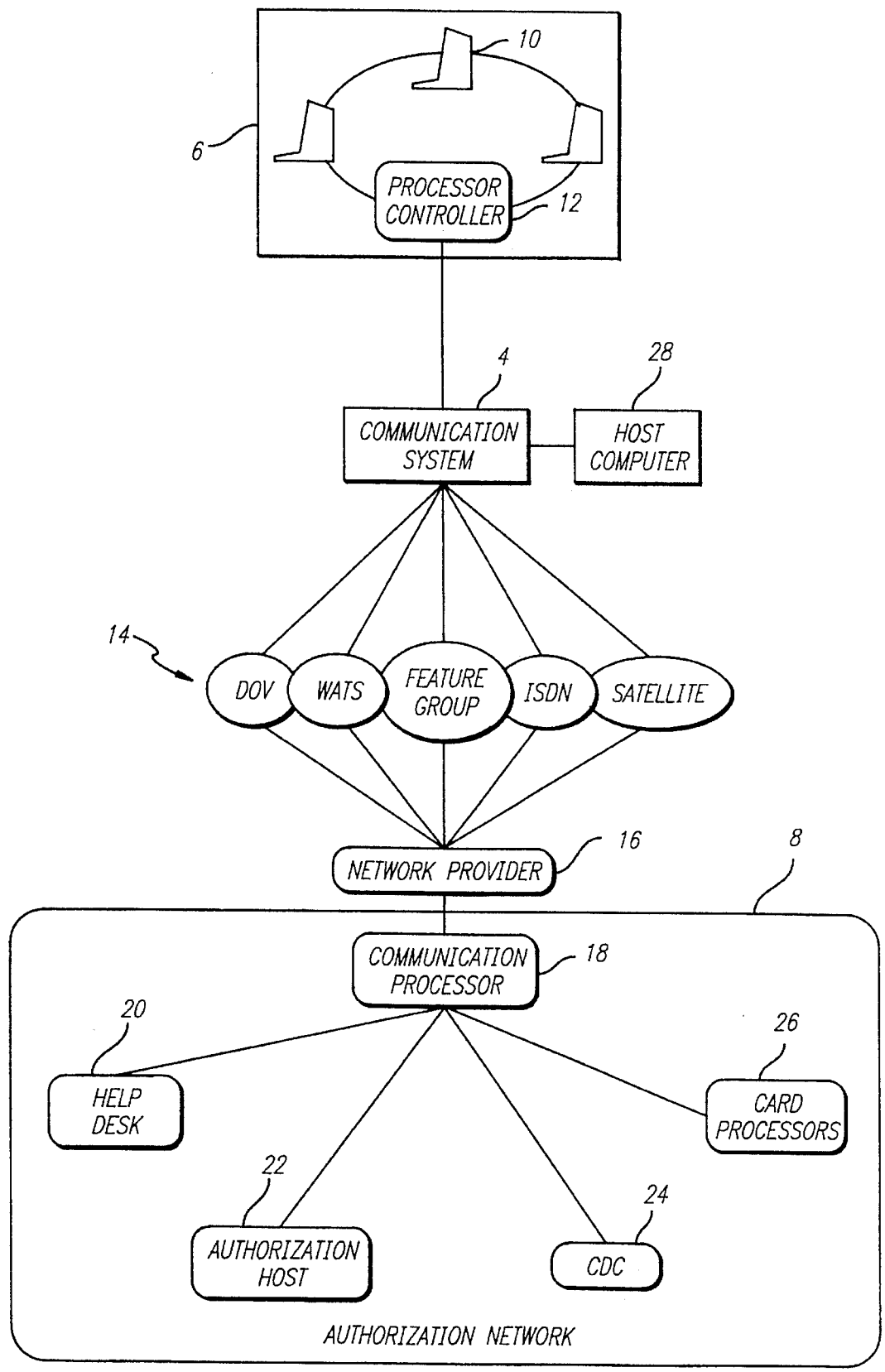
FIG. 1 depicts a block diagram of the operating environment of the present invention.

FIG. 1 depicts a block diagram of the operating environment of the present invention. Communication System (CS) 4 is an intelligent point-of-presence device installed in retail and mail order establishments as an interface between a retail information system (RIS) 6 and a transaction card Authorization network 8. RIS 6 includes a plurality of ECRs 10, which are used to perform sales transactions and electronic payments within the retail or mail order location. As used herein, the term ECR includes master ECRs, personal computers, mini-computers, and so on. Each ECR 10 is connected to a Processor Controller 12 which passes messages, such as transaction authorization requests, to CS 4. CS 4 passes messages back and forth between the RIS 6 and the Authorization network 8 via communication access method 14.

Telecommunications access method 14 is the local telecommunication access technology available in a particular geographic area. Such local access technology may include standard telephone service, WATS 800 service,, integrated services digital networking (ISDN), satellite technology, data-over-voice (DOV) and Feature Group Service. The type of Telecommunication access method 14 chosen to access the Authorization network 8 is the responsibility of the transaction card processor. Since CS 4 is capable of establishing communication with the Authorization Network 8 through any of the above-mentioned telecommunication access methods, CS 4 insulates the RIS 6 from differences in, or changes to, the access method 14 selected by the transaction card processor. In a preferred embodiment of the present invention, the Telecommunications access method 14 used by CS 4 to establish communication with the Authorization network 8, is a dial-up Feature Group B (950) Service.

When CS 4 dials the number for the Authorization network 8, a Network Provider 16 answers the call and handles the networking of all dial-up and point-of-sale devices between RIS 6 and the Authorization network 8. Authorization network 8 is a leased-line network that connects all Member/processors and major merchants to a particular transaction card processor. For example, within the USA, VISA U.S.A., Inc. contracts exclusively with CompuServe Inc. as the network provider, to provide point-of-sale networking services for transaction authorizations.

Within Authorization network 8 is a Communication processor 18 which is responsible for routing messages to and from a destination within the Authorization network 8. Destinations within the Authorization network 8 may include a Help Desk 20, an Authorization Host 22, a Central Data Capture Service (CDC) 24, and other Card processors 26. Help Desk 20 is a transaction card processor's remote support service for CS 4 and is explained in detail below. Authorization Host 22 is a card issuer's host computer for authorizing transactions in a typical manner.

When card transactions occur at RIS 6, records of the transactions are kept for a certain time period, typically a day or week. This periodic record of transactions is called a batch. When a merchant sends batches to a card processor, the batches are processed and stored by CDC 24.

Card processors 26 are entities which are capable of processing electronic payments and who are members of Authorization network 8. A particular card processor is called upon to process a transaction when the transaction cannot be processed by Communication processor 18. For example, if an authorization request indicates payment is being made by a type of transaction card which cannot be processed by Communication processor 18, then Communication processor 18 routes the authorization request to the appropriate card processor within the network for processing.

One function of CS 4 is to accept authorization requests from Processor Controller 12 and format transaction messages according to the latest information processing guidelines of the transaction card processor. This functionality eliminates the prior art requirement that merchants modify the processor controller software to accommodate any new guidelines.

CS 4 also acts as an interface between RIS 6 and a merchant's Corporate Host Computer 28. Using CS 4, Host Computer 28 may transmit and receive retail business information with RIS 6 at the same time authorization and capture messages are transmitted between Processor Controller 12 and Authorization network 8. Thus, contrary to prior art approaches, CS 4 is capable of processing non-financial data messages concurrently with financial data messages in a dial-up environment.

Figure 2:
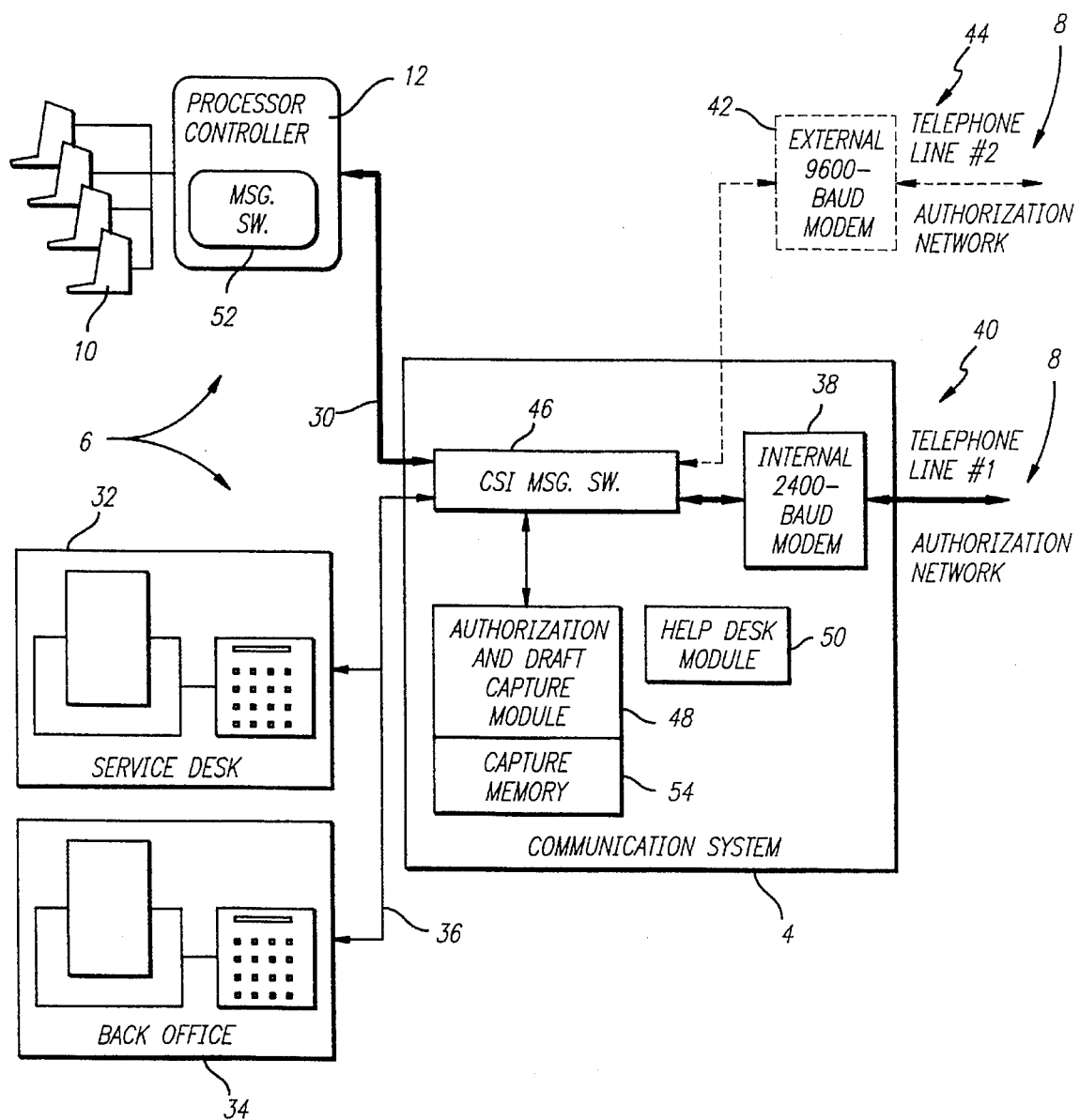
FIG. 2 depicts the hardware interfaces and software modules of the present invention.

The hardware interfaces and software modules of the present invention are shown in FIG. 2. FIG. 2 is not intended to imply a particular hardware configuration for CS 4, but rather indicates the necessary hardware interfaces and software modules which allow CS 4 to function as described herein.

CS 4 is connected to a RS232 serial port of Processor Controller 12 by a serial cable 30 in place of a modem. In a preferred embodiment of the invention, CS 4 is placed next to the Processor Controller 12 so that the cable between the two is short and error free. CS 4 is also capable of communicating with a retail establishment's administrative terminals located at Service Desk 32 or Backoffice 34 via a local area network (LAN) 36.

Internal Modem 38 allows CS 4 to communicate with Authorization network 8 of a particular service processor, or to communicate to a merchant Host Computer 28, shown in FIG. 1, through Telephone Line 40. External Modem 42 is for back-up or secondary communications between CS 4 and Authorization network 8, or for communications to the Host Computer 28 of FIG. 1 through Telephone Line Interface 44.

CS 4 contains software modules which are downloadable from the Help Desk 20 of FIG. 1, that operate in conjunction with the software being used in ECR 10 and Processor controller 12. The software modules include communication system interface (CSI) software module 46, Authorization and Draft Capture Module (ADCM) 48, and Help Desk Module 50. The CSI module 46 of CS 4 is the interface module responsible for the protocol and record formats used for communication between Processor Controller 12 and CS 4. The CSI module 46 also includes standard message switching, or communication manager logic, for routing messages to particular destinations. The ADCM 48 is a software module which reformats authorization requests and draft capture commands to conform with current POS processing guidelines of the transaction card processor. The Help Desk Module 50 controls processing of commands from Help Desk 20 of FIG. 1. For each retail and mail order location in which CS 4 is installed, Help Desk 20 downloads parametric information about the particular merchant location to Help Desk module 50.

Processor Controller 12 communicates with CSI module 42 of CS 4 through Message Software module 52 which is added to the software of Processor Controller 12. The communication protocol between CS 4 and Processor Controller 12 is an asynchronous ASCII exchange sequence called the Communication System Interface (CSI). In accordance with the present invention, CS 4 provides all bank card functions for RIS 8 through the use of the CSI message format which separates transaction card functions from ECR functions in the Processor Controller 12.

Authorization

CS 4 is capable of processing on-line authorization for the following type of transaction cards: credit cards, private label credit cards, and ATM direct-debit cards. CS 4 is also capable of processing on-line authorization for check acceptance transactions. When a message transmitted by the Processor Controller 12 is received by CS 4, CS 4 adds stored parametric information regarding the merchant to the message, and creates an acceptable message format for transmission to the Authorization network 8.

Referring to FIG. 2, when a transaction card sale is rung in at ECR 10, Processor Controller 12 sends an authorization request to CS 4. Processor Controller 12 passes the authorization requests to CSI module 46 in minimalist form including a draft ID, an amount, and an account number or other stripe data. The message is received by CSI module 46 of CS 4 which determines that the message is an authorization request, initiates a dial-up connection to the Authorization network 8, and then passes the request to ADCM 48. ADCM 48 is a reformatting editor which validates, formats, and enhances the transaction to conform to the standard authorization request format called for by the service provider, such as the standard VISA II format, for example.

The dial-up connection with the Authorization network 8 is established using Internal Modem 38. In one preferred embodiment, Internal Modem 38 establishes a rapid dial-up connection with Authorization network 8 using telco Feature Group B (950-exchange) expedited call set-up and a special fast-train modem handshake procedure. However, in the event of a failure of Internal Modem 38 or primary Telephone Line 40, External Modem 42 and secondary Telephone Line 44 may be used for Authorization network 8 communications. Once the connection is established, CS 4 transmits the authorization request, and obtains an authorization response from Authorization network 8.

When the Authorization network 8 transmits a response to CS 4, the message is received by CSI module 46 which determines the message is an authorization response and passes the response to ADCM 48 which reformats the response into an ISP response. If the transaction is authorized, CSI module 46 sends an authorization response message and optional receipt data to Processor Controller 12 and ADCM 48 captures the data in Draft Capture Memory 54. Capture memory 54 is used to store merchant financial transaction information which flows between RIS 6 to the Authorization network 8. Processor Controller 12 causes the returned authorization response message to be displayed at the ECR 10 that initiated the transaction, and causes the receipt (if any) to be printed at the ECR 10.

To achieve faster authorization response times, CS 4 implements several methods to streamline authorization service for the higher volume retail location containing several registers. First, CS 4 honors pre-dial requests from Processor Controller 12, if Processor Controller 12 is capable of making such requests. In pre-dialing, a sale rung in at an ECR 10 automatically commands CS 4 to dial the authorization network 8 (using Internal Modem 38 or External Modem 42). By the time the authorization request is ready to transmit, the telephone connection has been established.

Second, CS 4 executes a fast train modem handshaking procedure with the Network provider 16. A detailed description of the modem handshaking procedure is outside the scope of this description, but it suffices to say the handshaking procedure is designed to reduce communication set-up time between the calling and answering modem.

Third, CS 4 is capable of multi-trans message flow. In multi-trans message flow, CSI module 46 commands the Internal Modem 38 or External Modem 42 to delay dropping the telephone connection once an authorization response is received. When an additional authorization request is received, there is no need to re-establish the telephone connection. One phone call is thus made to service multiple transactions. Multi-trans message flow prevents the store system from dialing out for every new request.

To effect multi-trans authorization message flow, CSI module 46 maintains a queue of authorization requests. The dial-up connection to Authorization network 8 is maintained as long as any authorization requests remain in the queue, and for a parameterized length of time after the request queue is emptied. CSI module 46 then instructs either Internal Modem 38 or External Modem 42 to disconnect from the authorization network.

Conventional multi-trans message flow avoids lengthy dialing time, but subsequent transaction requests are forced to queue in the Processor Controller 12 and wait for a chance to be sent to the Authorization network 8. The present invention, however, does not assume that a single terminal is requesting service. In the middle market, there are many subordinate devices in one retail location. This fact has been known for some time, yet none of the major card processors, VISA included, have accommodated these requirements directly in a dial-up environment. Generally, leased-line types of access are necessary to correctly handle multiple terminals on a concentrator device. Leased-line is expensive and although dial-up is slow, generally merchants will choose dial-up due to the lower expense. In a preferred embodiment of the present invention, to handle requests from multiple ECRs in a dial-up environment, CS 4 supports both multi-trans and multi-leaved authorization message flow.

Figure 3:
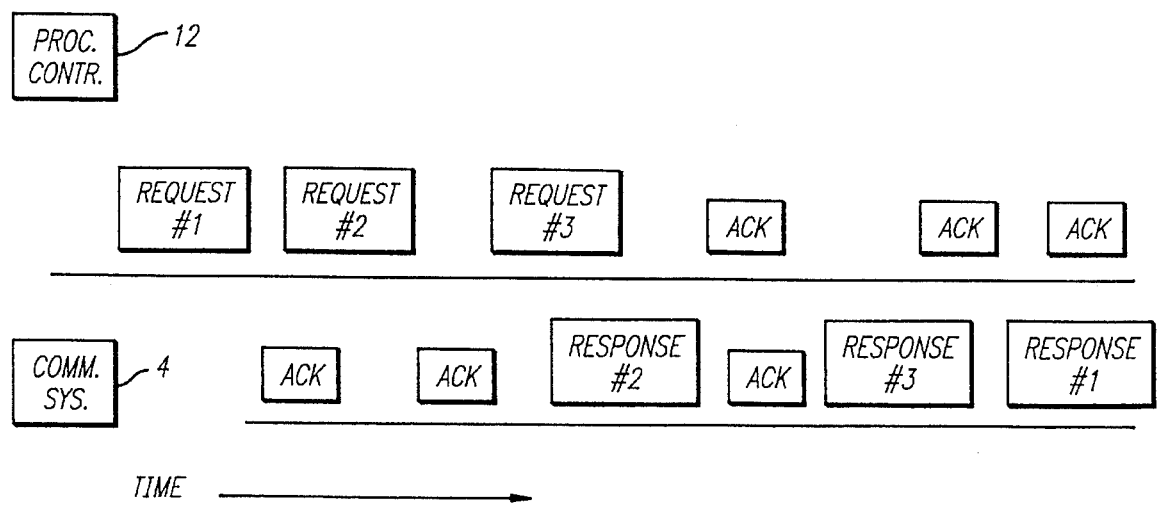
FIG. 3 illustrates multi-leaved message flow for three authorization requests.

In multi-leaved authorization message flow, multiple authorization requests may be processed independently of one another. Using multi-leaved message flow, CS 4 processes multiple transaction requests before responses from previous transactions have been received. FIG. 3 depicts multiple requests received and processed by CS 4 prior to receiving responses, which arrive in no particular order. The interleaved transaction set shown includes 3 requests which occur when the Processor Controller 12 to CS 4 interface is implemented in full duplex.

As shown, Processor Controller 12 sends request #1 to CS 4 which acknowledges receipt (ACK) and passes it to the Authorization network. When Request #2 is sent by Processor Controller 12, CS 4 accepts the requests and acknowledges receipt even though the response for Request #1 has not yet been returned from the network. As soon as request #3 is sent to CS 4, Response #2 is received from the network, and CS 4 immediately transmits the response to Processor Controller 12. Once Processor Controller 12 acknowledges receipt, CS 4 acknowledges receipt of Request #3. When Response #3 and Response #1 are received by CS 4, respectively, CS 4 sends the responses to Processor Controller 12, which acknowledges receipt and completes the transactions. As shown in FIG. 3, when a response is received, CS 4 returns the response to the Processor Controller 12 regardless of the order in which the original requests entered the network.

Figure 4:
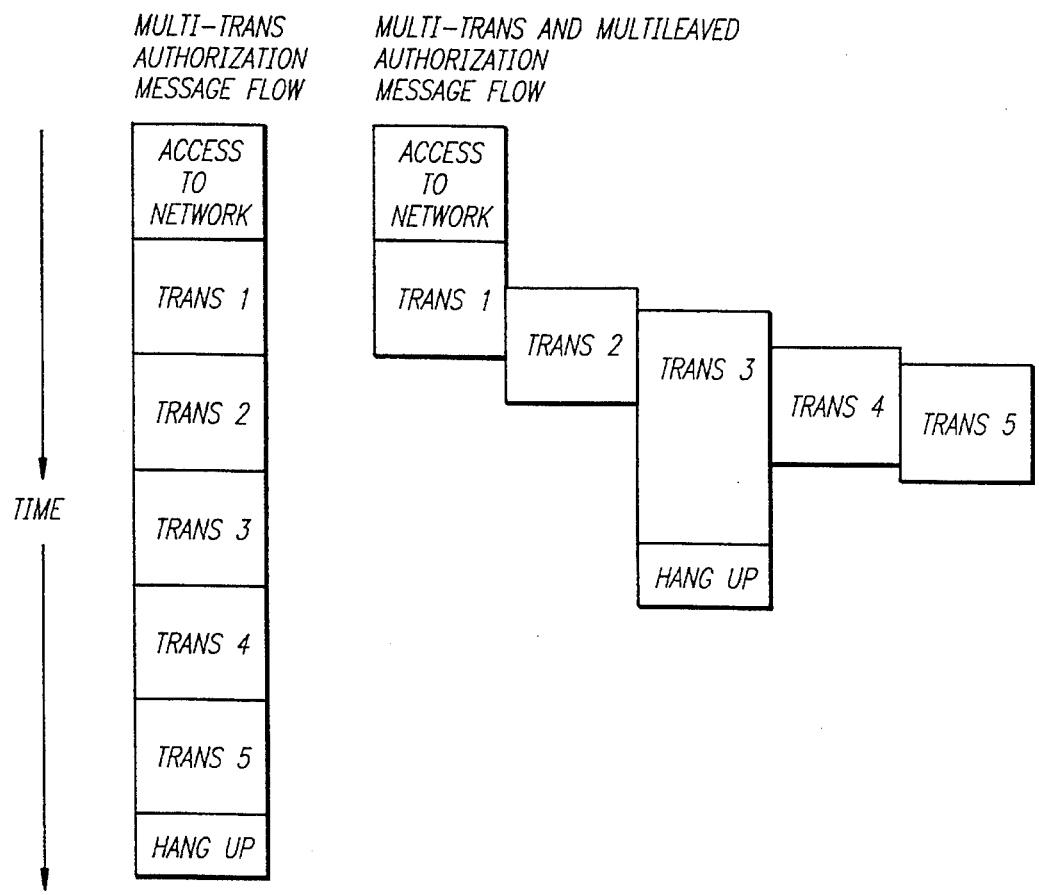
FIG. 4 depicts a comparison of the time saved between multi-trans communications and a combination of multi-trans and multi-leaved communications.

FIG. 4 depicts a comparison of the time saved between multi-trans communications and a combination of multi-leaved and multi-trans communications in which 5 transactions, TRANS1, TRANS2, TRANS3, TRANS4 and TRANS5 are initiated and completed (e.g., a request sent and a response received). In multi-trans message flow, once the network is accessed, each transaction after TRANS1 must wait for completion of the previous transaction before being processed. After TRANS 5 is completed, access to the network is terminated. In a combination of multi-trans and multi-leaved message flow, once the network is accessed, the transactions are processed independently of one another. As shown in the example, TRANS2 began processing before TRANS1 completed, and TRANS4 and TRANS5 completed before TRANS3. After the TRANS3 is completed, access to the network is terminated.

As shown, CS 4 provides authorization response times that are substantially faster than conventional dial-up terminals. CS 4 implements both multi-trans message flow and multi-leaved message flow in a dial-up environment to provide authorization response time nearly equal to that provided by leased lines while using less expensive technology.

Help Desk

Referring again to FIG. 1, in one preferred embodiment, CS 4 supports dial-up communications with a Help Desk 20 of a card processor. The Help Desk 20 is a facility where card processor personnel operate a processor or workstation to provide remote support services to CS 4. These services include storing application and parametric data, downline loading of application software, gathering of performance and diagnostic data from CS 4, and controlling communication at multiple merchant sites.

Figure 5:
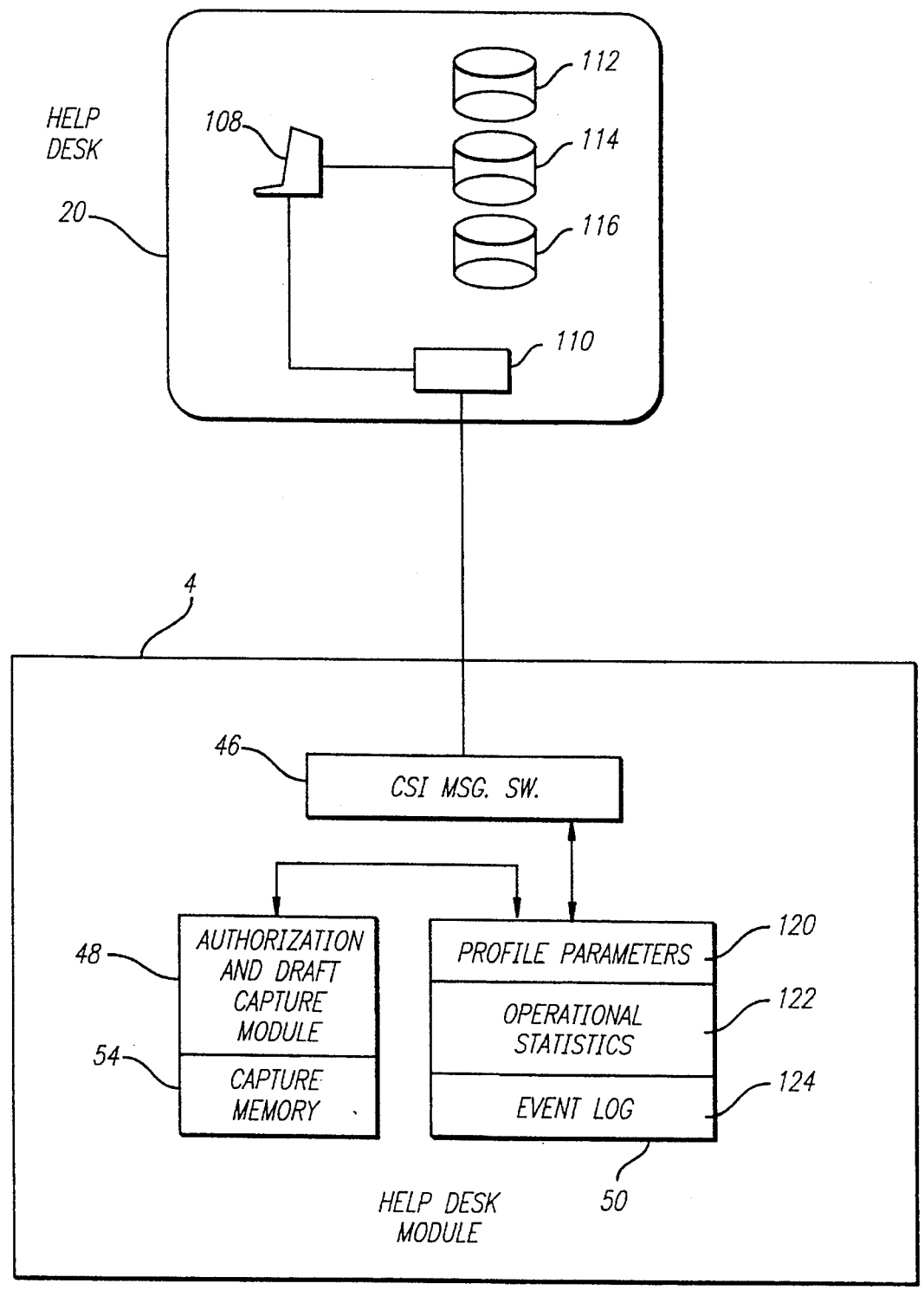
FIG. 5 depicts a block diagram of a remote Help desk facility.

FIG. 5 depicts a block diagram of the remote Help desk facility 20. Help Desk 20 includes a workstation 108 for operator control of CS 4 via a modem 110. Workstation 108 has access to stored CS application software 112 and CS parameters 114, which are various merchant profiles. Workstation 108 is also connected to a database 116 for storing operational statistics received from CS 4.

Once the connection is made between Workstation 108 and CS 4, the CSI module 46 handles the communications between Help Desk 20 and Help Desk Module 50. Help Desk Module 50 contains the logic necessary to interrogate Profile Parameters settings 120, service quality Operational Statistics 122, and service quality Event Log 124. The Operational Statistics 122 are a variety of system, application, and communications-oriented statistics, and the Event Log 124 is a log of time stamped events occurring in CS 4.

The information contained in the Operational Statistics 122 and Event Log 124 may be used by retailers and the card processor as diagnostic data for error isolation and subsequent correction procedures. According to a further aspect of the present invention, the statistics maintained in CS 4 are independent of the software application running on the Processor Controller 12 of FIG. 1. The statistics, which are stored by CS 4 as both date/time stamp fields and count accumulators, are periodically monitored by Help Desk 20 and include: 1) the unique identification code of CS 4, 2) software revision and parameter revision, 3) time stamp of last software or parameter change, 4) number of failed authorization attempts, 5) number of successful authorization attempts, 6) authorization response time average, 7) type of communications access used as the primary method (950 access, local node, WATS . . . ), and 8) number of errors of any kind.

The date/time stamp fields are maintained as 6 bytes (in a yy mm dd hh mm ss format) while the count accumulators are maintained as 16-bit unsigned integers. In a preferred embodiment, CS 4 maintains the following statistics:

A. General Statistics
  1. Date/time of last . . .
    a. Hot-start
    b. Warm-start
    c. Cold-start
    d. Connection to Authorization Host
    e. Connection to Help Desk
    f. Line problem
    g. PC problem
    h. Time these statistics were cleared
    i. Connection to CDC
  2. Restart Counts
    a. Hot-starts
    b. Warm-starts
    c. Boots
    d. Cold-starts
B. Application Statistics
  1. Transaction counts
    a. Transactions received
    b. Transactions rejected (invalid)
    c. Transactions discarded (timeout)
  2. Authorization host response time analysis in 1 second increments.
  3. Authorization host dial-out connections
    a. Connections completed
    b. Connections attempts failed
    c. Dial re-attempts to primary telephone number
    d. Dial attempts to secondary telephone number
    e. Unexpected losses-of-carrier
  4. CDC dial-out connections
    a. Connections completed
    b. Connections attempts failed
    c. Dial re-attempts to primary telephone number
    d. Dial attempts to secondary telephone number
    e. Unexpected losses-of-carrier
C. Processor Controller Port Statistics
  1. CSI Mode
    a. Incoming frames received
    b. Incoming frames discarded
    c. Outgoing frames transmitted
    d. Outgoing frames retransmitted
    e. Outgoing frames discarded
D. Internal Modem Port Statistics
  1. CSI Mode
    a. Incoming frames received
    b. Incoming frames discarded
    c. Outgoing frames transmitted
    d. Outgoing frames retransmitted
    e. Outgoing frames discarded
  2. Synchronous Mode
    a. Incoming frames received
    b. Incoming frames discarded
    c. Outgoing frames transmitted
    d. Outgoing frames re-transmitted
    e. Outgoing frames discarded
    f. Number of normal response models received
    g. Number of receiver-not ready received
    h. Number of receiver-not ready sent
  3. Visa-2 Format Async Mode
    a. Incoming frames received
    b. Incoming frames discarded
    c. Outgoing frames transmitted
    d. Outgoing frames retransmitted
    e. Outgoing frames discarded
E. External Modem Port Statistics
  1. CSI Mode
    a. Incoming frames received
    b. Incoming frames discarded
    c. Outgoing frames transmitted
    d. Outgoing frames retransmitted
    e. Outgoing frames discarded
  2. Synchronous Mode
    a. Incoming frames received
    b. Incoming frames discarded
    c. Outgoing frames transmitted
    d. Outgoing frames re-transmitted
    e. Outgoing frames discarded
    f. Number of normal response modes
    g. Number of receiver-not-ready received
    h. Number of receiver-not-ready sent
  3. Visa-2 Format Async Mode
    a. Incoming frames received
    b. Incoming frames discarded
    c. Outgoing frames transmitted
    d. Outgoing frames retransmitted
    e. Outgoing frames discarded Through Workstation 108 and Help Desk Module 50, card processor personnel may interrogate and/or clear the Operational Statistics 122 and the Event Log 124 in CS 4, and reset the software modules in CS 4 remotely by a software down-line load. The Help Desk 20 can also set a real-time clock within CS 4, or dump any desired block of memory in CS 4.

In addition, Help Desk 20 personnel can submit financial transactions to CS 4 for transmission to the Authorization network 8, of FIG. 1, remotely in order to debug and test CS 4 or to determine if problems lie between CS 4 and the Authorization network 8. Help Desk 20 may submit test or real financial transactions to CS 4, request reports, review, adjust and release batches, and so forth in the same fashion that Processor Controller 12 of FIG. 1 does locally.

Figure 6:
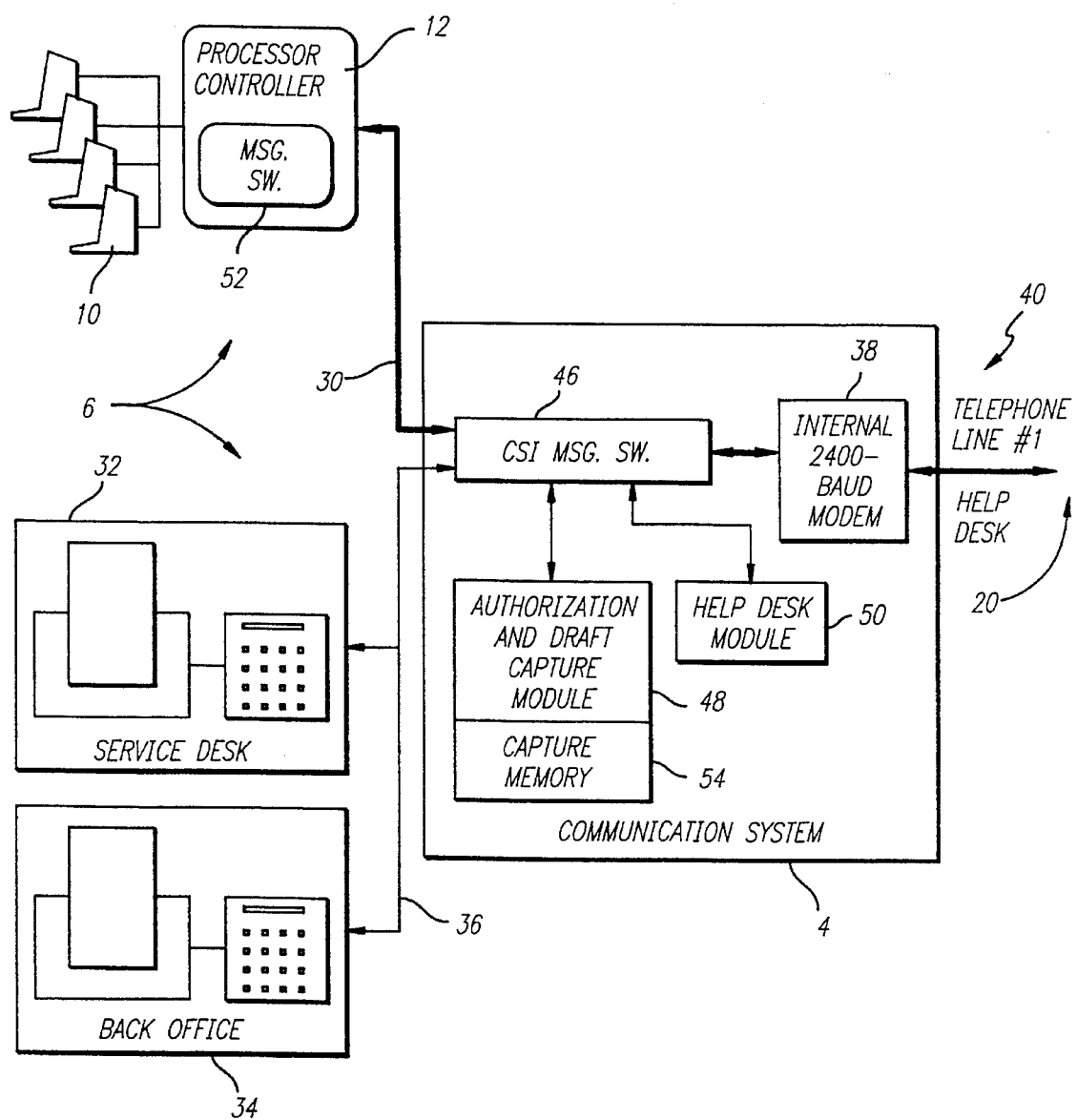
FIG. 6 depicts data flow during Help Desk communications using an Internal Modem.
Figure 7:
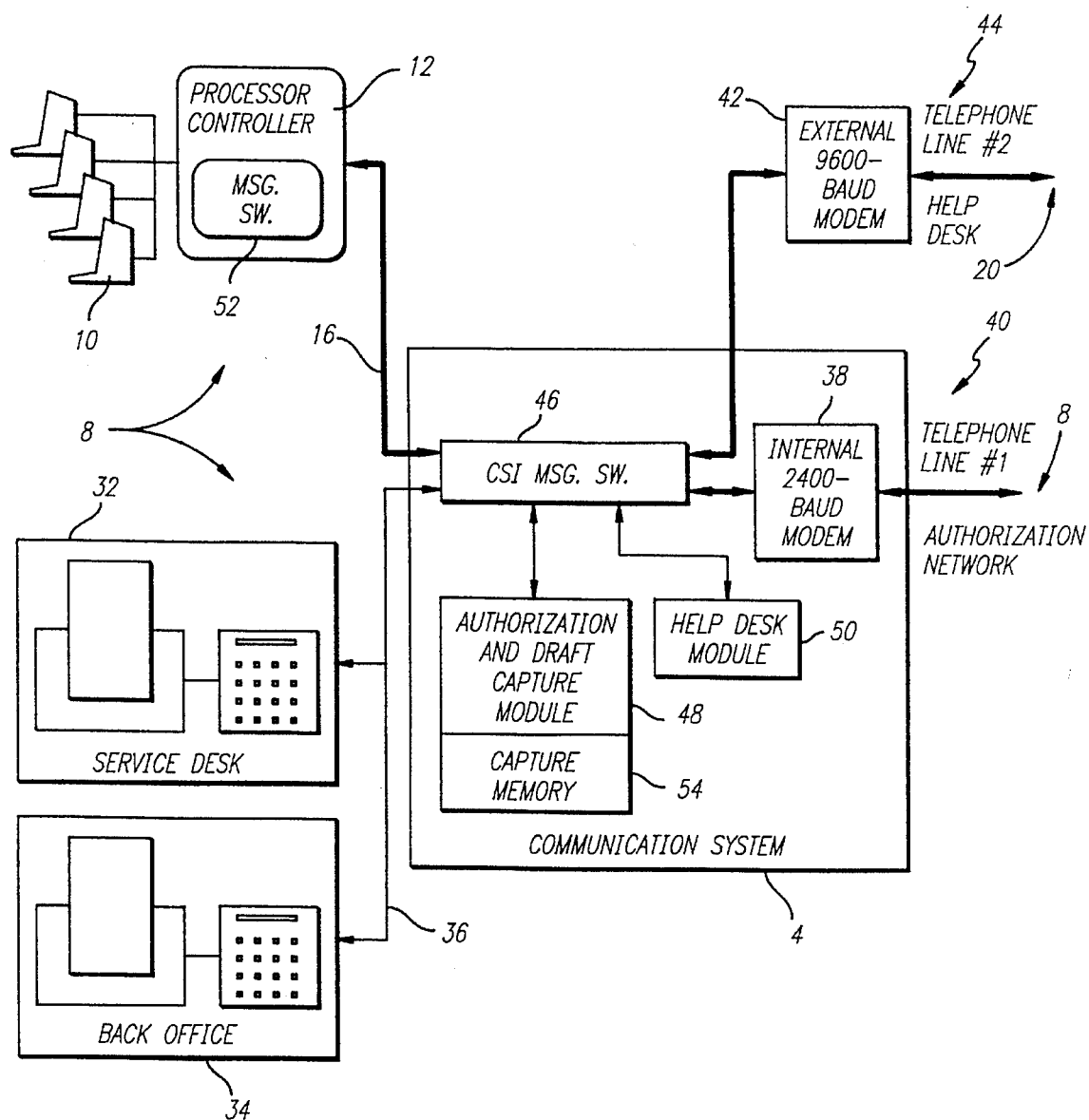
FIG. 7 depicts data flow during Help Desk communications using an External Modem.

FIGS. 6 and 7 depict help desk data flow communications through CS 4. As shown in FIG. 6, in the absence of an external modem, a dial-up connection to Help Desk 20 through Internal Modem 38 precludes normal authorization processing. Queries and updates from Help Desk 20 flow through CSI module 46 which directs the messages to the correct software module within CS 4. If CS 4 is configured with External Modem 42, CS 4 can connect to Help Desk 20 without interfering with normal authorization processing as shown in FIG. 7. CSI module 46 can route authorization requests to the Authorization network 8 through Internal modem 38 at the same time commands from Help Desk 20 are routed to the appropriate software module through External Modem 42.

When CS 4 is first installed, a dial-up connection is made to Help Desk 20. In a preferred embodiment, either Help Desk 20 or CS 4 may initiate a dial-up help desk communication session. CS 4 initiates the communication by encoding a help-desk telephone number in a startup ROM. Once communication is established, CS 4 identifies itself by serial number and receives the download of software that has been set up for that merchant location (identified by the serial number for that particular CS 4 unit).

In a preferred embodiment, once CS 4 receives the download and begins normal processing operations, Help Desk 20 accepts a telephone call from CS 4 once per day. At this time CS 4 deposits its statistics in the Database 116 at Help Desk 20. Also at this time, CS 4 receives any new download information from Help Desk 20 that is prepared for CS 4.

Electronic Draft Capture

Referring again to FIG. 2, in one embodiment CS 4 can be optioned to perform draft capture approximately 1,500 credit and debit card drafts as a result of authorization work. Some stores may contain a customer Service Desk 32 which includes terminals and printers dedicated to handling merchandise returns and exchanges. While one of the terminals may be activated for the purpose of entering voids and adjustments and for sending the day's information to CS 4 for storage, another terminal with an integrated card swipe and printer may be used in a separate department without using a dedicated processor controller.

Whenever CS 4 receives data from Processor Controller 12 or Service Desk 32, CSI module 46 passes the data to ADCM 48 which captures authorization data in Capture Memory 54 for subsequent transmission to Central Data Capture Service (CDC) 24 of FIG. 1. Once the data is stored in Capture Memory 54, Processor Controller 12 has complete control over the information and is able to send all commands necessary to balance store totals. A simple terminal and printer may be connected to CS 4 for this purpose.

ADCM 48 captures both on-line and off-line purchase transactions for credit cards and ATM cards. On-line transactions that are not approved by the service provider are never captured by ADCM 48. On-line transactions that are approved by the service provider are always captured, but credit card and ATM card transactions are handled somewhat differently.

When CS 4 transmits an authorization request from Processor Controller 12 to the service provider, the request is either approved or denied. On-line credit card purchases that are approved are captured by ADCM 48, but ADCM 48 marks the capture record as being in suspended status. ADCM 48 sends the approval information and receipt data to ECR 10 via CSI module 46. After ECR 10 prints a credit card draft and the customer signs the draft, ECR 10 instructs ADCM 48 to activate the capture record.

On-line ATM card purchases, returns, and cancellations that are approved are captured by ADCM 48, and the capture record is not suspended. Unlike credit card transactions, the customer authorizes such ATM card transactions by pre-entering a personal identification number (PIN) rather than by signing a draft, so the transactions are effected immediately upon authorization.

ADCM 48 also captures off-line transactions: transaction card purchases and returns, and ATM card purchases, returns, and cancellations. Such off-line transactions are used to capture drafts that have been authorized by telephone or another off-line method, and to capture transactions (such as transaction card returns) that do not require authorization.

Merchants often have many ECRs and account for sales by tender type according to the ECR lane, the cash drawer, the ECR operator, or the operator shift, for example. These type of merchants are known as multi-lane and multi-shift merchants. To satisfy the needs of multi-lane and multi-shift merchants, ADCM 48 has the ability to maintain multiple active capture groups and multiple settlement batches concurrently. Each captured draft is posted to a particular group, and each group of drafts belongs to a particular batch. ADCM 48 maintains counts and totals at both the group and batch level, and supports review and reporting at either level.

Figure 8:
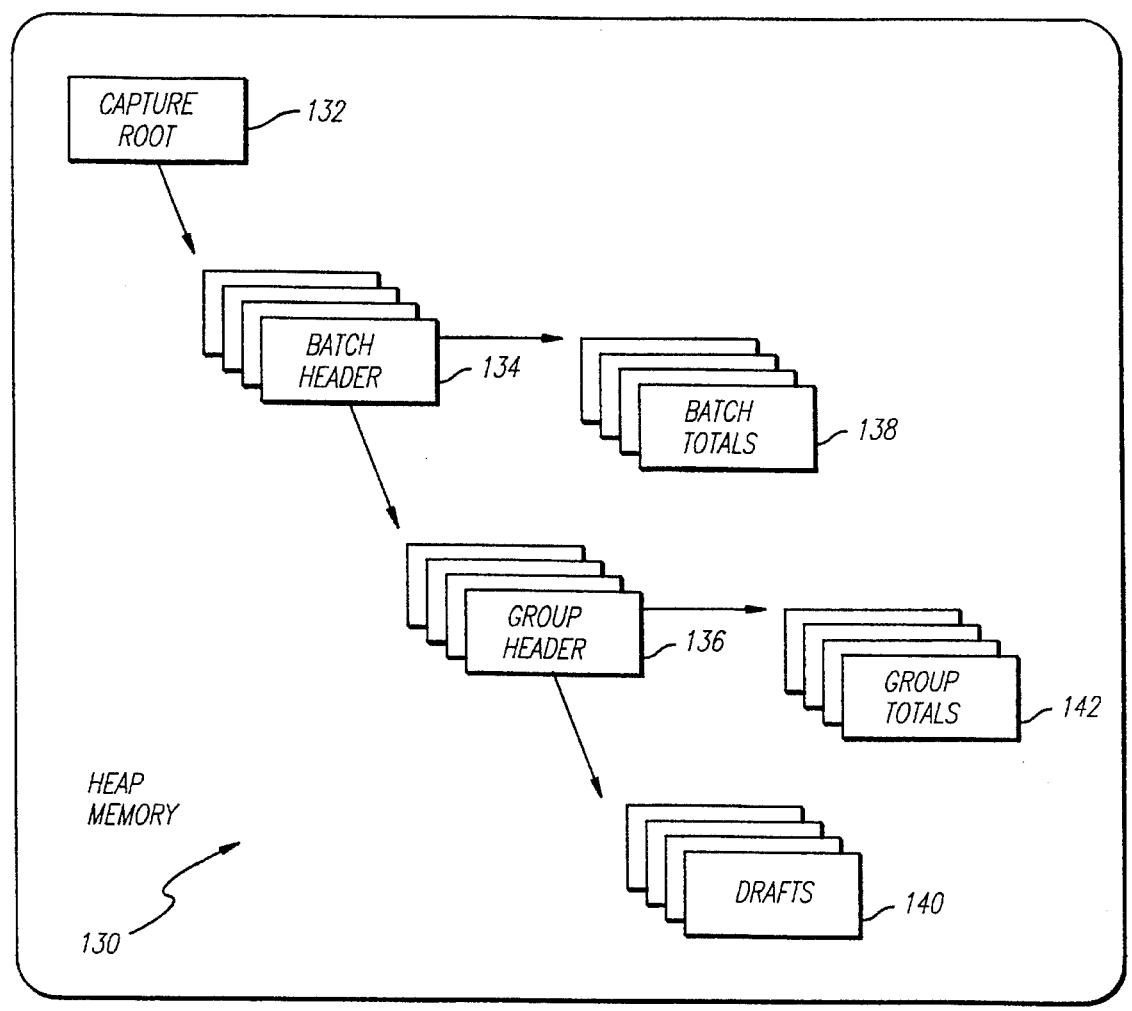
FIG. 8 illustrates how Heap memory is organized.

As stated above, ADCM 48 stores batches in draft Capture memory 54 shown in FIG. 2. In one preferred embodiment, Capture memory 54 includes 14 banks of memory totalling 448K. Capture memory 54 is organized as a dynamically-allocated memory pool called heap memory which is used principally for draft capture. FIG. 8 illustrates how Heap memory 130 is organized. A data structure called the Capture Root 132 is used to anchor a threaded list of Batch Header records 134, one for each settlement batch. Capture Root 132 is placed in a canonical memory location so that the heap can be preserved across software down-line loads, even when a new version of application software is loaded. Each Batch Header 134 anchors two threaded lists: a list of Group Header records 136 for each group contained within the batch, and a list of Batch Total records 138 for the various batch totals. Each Group Header 136 anchors two threaded lists: a list of Draft Capture records 140 for each captured draft contained within the group, and a list of Group Total records 142 for the various group totals.

The way this multi-group and multi-batch capability is used is up to each merchant. A merchant might choose to maintain a separate group for each cash drawer and/or a separate batch for each shift, for example, or he might not choose to use multiple groups or multiple batches at all. In a preferred embodiment, each batch is identified with a unique four-character batch ID. Each group is identified with a unique four-character group ID. Each draft is identified by a Processor Controller 12 generated draft ID up to six characters long; the draft ID is unique within the specified capture group, but need not be unique across all groups.

Whenever a Processor Controller 12 sends an on-line or off-line request to ADCM 48, the Processor Controller 12 must specify the group into which the transaction is to be captured. Each group belongs to a particular batch. Newly-created groups are initially assigned to a particular batch, but ADCM 48 has the capability to transfer a group from one batch to another. Each group is in one of two possible statuses: open or closed. New drafts are not posted to a closed group. Each closed group may be independently reviewed, adjusted, and reconciled. Review, reporting, and control of groups may be accomplished either from Processor Controller 12 or via a LAN-connected Backoffice terminal 34.

ADCM 48 opens a new group upon reception of a Create Group transaction command. A group must be opened before a user posts new drafts the group. An open group is closed with a Close Group transaction. ADCM 48 does not permit the posting of additional drafts to a closed group but does allows existing drafts to be reviewed, adjusted, voided, deleted, suspended, and activated. Users may delete a closed group with a Delete Group transaction, transfer a group to another batch with a Transfer Group transaction, or re-open a group with a Continue Group transaction.

Each batch may be in one of five possible statuses: open, closed, released, locked, or settled. Closing a batch closes all groups in the batch, thereby precluding further postings. Once a batch is closed, its constituent groups may not be reopened, and the batch may no longer have new groups created in it or transferred to or from it. Each closed batch may be independently reviewed, adjusted, reconciled, and ultimately released by the merchant for transmission to CDC 24 of FIG. 1. Review, reporting, and control of batches may be accomplished either from Processor Controller 12 or via a LAN-connected Backoffice terminal 34. Once a batch is released, it may no longer be adjusted.

ADCM 48 opens a new batch upon reception of a Create Group transaction command. A batch must be opened before any groups may be created in it or transferred to it. Closing an open batch with a Close Batch transaction closes all groups in the batch, and thus prevents additional drafts from being posted to the batch but still allows existing drafts to be reviewed, adjusted, voided, deleted, suspended, and activated. A closed batch may be enqueued for subsequent transmission to CDC 24 with a Release Batch transaction, or re-opened with a Continue Batch transaction. Once a batch has been released, it may no longer be adjusted unless it is first "un-released" with a Close Batch transaction.

While CS 4 is actually transmitting a released batch to CDC 24, ADCM 48 changes the status of the batch from released to locked. Once the batch is accepted by CDC 24, its status changes to settled. If transmission of a batch to CDC 24 fails for any reason (e.g., line problems or equipment outage), the batch remains in released status so that it will be re-transmitted at the next opportunity. If a batch is rejected by CDC 24 for any reason, however, it reverts to closed status.

Batch Adjustment

ADCM 48 references captured drafts by group ID plus draft ID. Each captured draft may have one of three possible statuses: active, suspended, or void. An on-line transaction card purchase that is approved by Authorization Host 22, of FIG. 2, results in a captured draft that is initially in suspended status. Referring to FIG. 2, Processor Controller 12 must subsequently issue an Activate Draft transaction after the customer signature is obtained, or a Void Draft or Delete Draft transaction if no signature is obtained. On-line ATM transactions (pre-authorized by PIN) and all off-line transactions result in captured drafts that are in active status.

The status of a captured draft may be changed by means of the Void Draft, Suspend Draft, and Activate Draft transactions. An active draft may be suspended or voided. A suspended draft may be activated or voided. Once a draft has been voided, however, its status may no longer be changed. The transaction amount and/or secondary amount of a transaction card draft may be modified by means of the Adjust Draft transaction. ATM drafts, however, may not be adjusted. A suspended or voided draft may be deleted altogether from the capture batch by means of the Delete Draft transaction. Once a draft is deleted, the captured data is lost and cannot be recovered. An active draft may not be deleted without first changing its status to suspended or void.

Group/Batch Review and Reporting

Group or batch review and reporting may be performed by Processor Controller 12 (if the merchant supports these functions) or by a LAN-connected Backoffice terminal 34. CS 4 provides several transactions to facilitate review and reporting.

A Retrieve Draft transaction may be used to retrieve a particular draft (identified by group ID plus draft ID). It may also be used to retrieve all drafts in a group or a batch sequentially (first, last, next, previous, or current draft). CS 4 maintains group and batch counts and dollar totals, keyed as follows:

| | |
|---|---|
| GGGG | counts and grand totals by group |
| GGGG+CCCC | counts and net totals by group + card type |
| GGGG+CCCC+TT+V | counts and totals by group + card type + transaction type + draft status |
| BBBB | counts and grand totals by batch |
| BBBB+CCCC | counts and net totals by batch + card type |
| BBBB+CCCC+TT+V | counts and totals by batch + card type + transaction type + draft status |

A Retrieve Total transaction may be used to retrieve a particular total (identified by batch ID or group ID, card type, transaction type, and status). It may also be used to retrieve group or batch totals sequentially by key (first, last, next, previous, or current key). CS 4 does not maintain batch and group totals continuously, but rather calculates them on-demand when they are first requested by a Retrieve Total transaction and deletes them whenever any activity occurs within the batch or group that invalidates the last-calculated set of totals for a particular batch or group. Consequently, response to some Retrieve Total transactions may be delayed briefly while CS 4 calculates the necessary totals.

A Retrieve Status transaction may be used to determine the status of a particular group (open or closed) or batch (open, closed, released, locked, or settled). If a batch has been transmitted to CDC 24 by CS 4, this transaction also retrieves a three-digit sequential batch number that was assigned by CS 4 and a batch response code and batch response message that were returned by CDC 24. Retrieve Status may also be used to scan all batches or all groups within a batch in sequential fashion (first, last, next, previous, or current).

Transmission of Captured Drafts

In one embodiment, CS 4 is configured to transmit released batches to CDC 24 automatically at a scheduled time outside of normal business hours. The auto-settle time is controlled by a Help Desk 20 downloadable parameter. However, Processor Controller 12 or Back Office Terminal 34 may command CS 4 to transmit to CDC 24 at any time by issuing a Settle Now transaction.

In a preferred embodiment, communications with CDC is via dial-up asynchronous communications at 1200 or 2400 bits-per-second using standard Visa Second Generation protocols and message formats. Help Desk 20 downloadable parameters control the speed and mode of the dial-up connection, the dial-up timeout interval, the number of times a primary and secondary telephone numbers are attempted, and the actual telephone numbers to be dialed.

When a batch is transmitted to CDC 24, any suspended drafts that remain in the batch (there should be none) are sent to CDC 24 as voids. ADCM 48 assigns each batch a three-digit sequential number (as required by CDC) when the batch is actually transmitted to CDC 24, and saves the batch number and the CDC response code and response message so it may appear on a subsequent batch settlement report.

Secondary Modem Control (Pass Through Mode)

Contrary to a true dial-up authorization terminal, Processor Controller 12 exists in the retail location for more than just handling the electronic payment. It is common for sales/audit logs, inventory files, software updates, shipping notices, payroll information and the like to be transmitted between the store and the corporate host computer.

Figure 9:
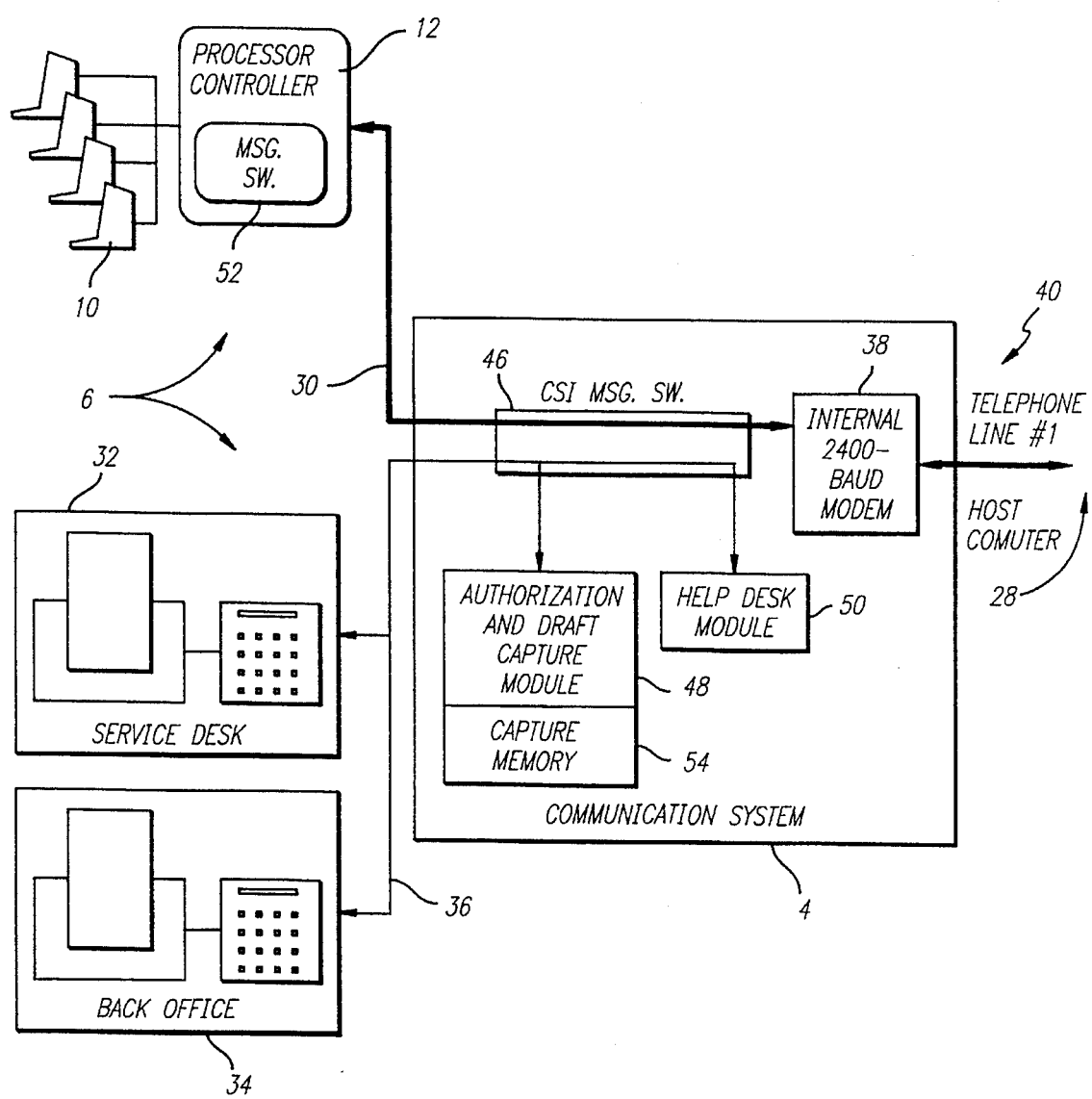
FIG. 9 depicts data flow during pass through communications using an Internal Modem.

FIG. 9 depicts data flow through CS 4 when CS 4 is in pass-through mode using Internal Modem 38. In this mode, CS 4 emulates a modem, including a subset of Hayes series-V Smartmodem AT-commands, to support direct communications between Processor Controller 12 and a merchant's Host Computer 28 (to pass non-transaction-card-related data). In one embodiment, Modem 38 attempts a V.22bis connection (2400 bps) but automatically downshifts to a V.22/Bell 212A connection (1200 bps) if the other modem does not support 2400 bps. In this mode, pass-through communications to the merchant's Host computer 28 precludes normal authorization processing by preempting Internal Modem 38.

Processor Controller 12 places CS 4 into pass-through mode by asserting a Data Terminal Ready (DTR) signal on a RS232 serial port of Processor Controller 12. While CS 4 is in this mode, normal communications with Authorization network 8 of FIG. 2 are suspended. When Processor Controller 12 de-asserts the DTR signal, the Modem 38 goes on-hook (i.e., disconnects) and an ISP port on CS 4 reverts to normal CSI mode.

Figure 10:
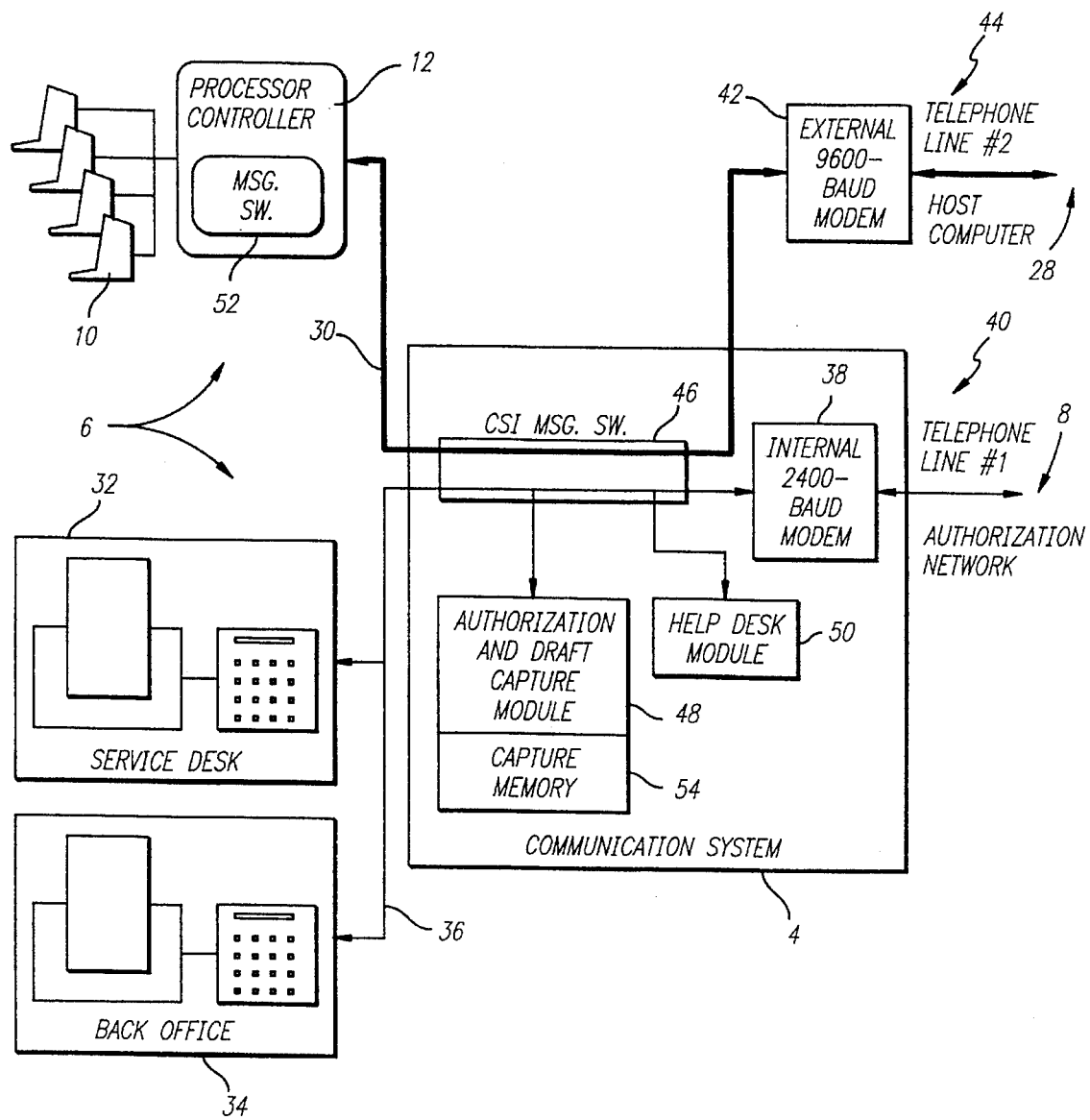
FIG. 10 depicts data flow during pass through communications using an External Modem.

FIG. 10 depicts pass-through for applications that require full-time or lengthy access from RIS 6 to Host 28 during regular business hours (when credit authorizations must not be interrupted) through the use of External Modem 42. Processor Controller 12 may then make use of all functions of external Modem 42, including both asynchronous and synchronous modes. While in this mode, the only function of the CS 4 software is to monitor the DTR line and return CS 4 to normal mode when the DTR signal is deactivated by Processor Controller 12.

As depicted in FIG. 10, store management information may be transmitted from Processor Controller 12 to Host Computer 28 using External Modem 42 at the same time authorization and capture messages are transmitted and received between CS 4 and Authorization network 8 through Internal Modem 38. If CS 4 is configured with External Modem 42, it can accommodate pass-through communications to Host Computer 28 without interfering with normal authorization processing; however, Processor Controller 12 cannot process financial transactions (credit/debit card or ATM card) until it terminates pass-through mode.

Host Computer 28 may initiate the flow of store management data by calling CS 4 on Internal Modem 38 or External Modem 42. If External Modem 42 is called, Processor Controller 12 is notified and store management data begins to flow between the Processor Controller 12 and the Host Computer 28 independently of real time authorization data that is being sent via Internal Modem 38. Both the Internal Modem 38 and External Modem 42 driven by CS 4 logic are protected from incoming access by a login/password sequence in CS 4 which is set up for each merchant.

Secondary modem control allows the retail information system unrestricted access to and from the Authorization network 8 or corporate host system regardless of the time of day. When CS 4 is configured with External Modem 42, CS 4 can move the credit authorization function to External Modem 42 if CS 4 detects that Internal Modem 38 has failed or has been disconnected from the telephone line. When CS 4 is configured with External Modem 42, Processor Controller 12 can direct data to either communications port of CS 4 and can receive data from either communications port of CS 4.

Backoffice Terminals

Referring now to FIGS. 2, 6, 9, and 10, CS 4 may optionally be connected to a merchant's Back Office 34 and/or a Customer Service Desk 32. Back Office 34 and Customer Service Desk 32 are typically configured with one or more administrative terminals, such as the commercially available Hypercom T-7 terminals (not shown). The terminals in Back Office 34 and/or at Customer Service Desk 32 are connected to CS 4 via a twisted-pair RS-485 multi-drop local area network (LAN) 36.

In one embodiment a maximum of sixteen terminals may be supported by one CS 4, although in a preferred embodiment, most installations will be configured with three terminals or less. Each T-7 terminal has a 2-by-20 character display, a keyboard, and a magnetic stripe reader capable of reading both track 1 and track 2 data. Each T-7 terminal is typically configured with a companion P-7 20-column continuous-formprinter, although this is not required. Merchants may employ these terminals in two ways: 1) for backoffice functions: group/batch review, adjustment, reporting, reconciliation, and control. 2) for customer service functions, such as entering on-line and off-line transaction card purchase and return transactions, including magnetic stripe capture.

Communication Protocols

Referring again to FIG. 2, the business of long-haul communications from RIS 6 to Authorization network 8 is handled completely by the CS 4. Error-recovery, alternate routing and transaction flow in the network 8 are handled in the CS 4 by the CSI Module 46. The advantage for the merchant is that the Processor Controller 12 software is isolated from the actual long-haul communications technique that is in use. The application running on Processor Controller 12 may remain the same from store to store even though one store may use fast dial facilities and another may use a leased line, for example. This is due in part to the communication protocol between the CIS module 46 in CS 4 and the message software module 52 within Processor controller 12. CSI module 46 is capable of accepting input from any source which utilizes the CSI message format.

The architecture for the messages passed between CS 4 and Processor Controller 12 is based on the OSI (Open Systems Interconnection) reference model developed by the International Organization for the Standardization (ISO) which is well known in the art. The OSI model defines a standard seven layer communication architecture including a data link layer, a transport layer and a presentation layer.

The data link layer is responsible for providing higher layers with error detection and control. The communication between Processor Controller 12 and CS 4 is a point-to-point conversation at the link level and flow control levels (e.g., CS 4 is directly attached to the Processor Controller 12), via a short cable. The link level protocol involved is therefore very simple and easy to implement, since a large portion of long distance communications protocol definition involving extensive error-handling provisions is eliminated.

Figure 11:
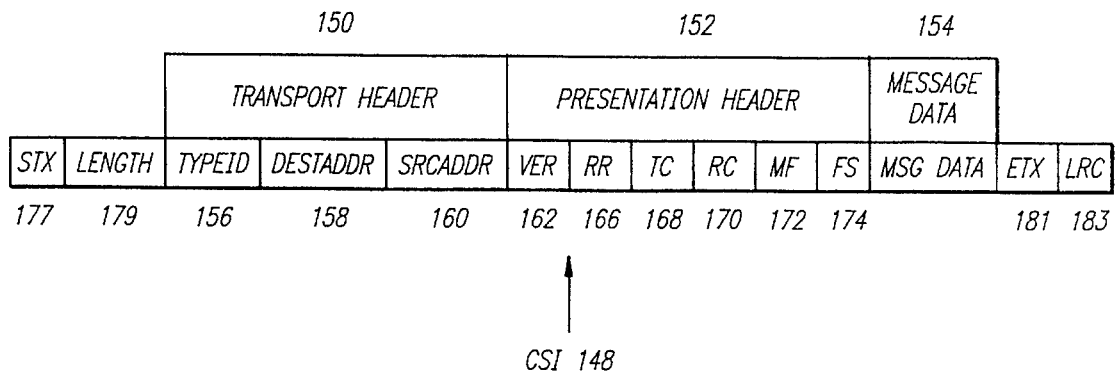
FIG. 11 depicts the Communication System Interface message format.

At the upper layer of the Communication System Interface (CSI) protocol (transport and presentation layers of the OSI model) the communication is capable of accommodating the addressing of multiple ECRs 10, which are subordinate to the Processor Controller 12. FIG. 11 depicts the CSI message format of the present invention. The CSI message format 148 includes three sections, a transport header 150, a presentation header 152, and message data 154.

The transport header 150 identifies the entities between which information is transferred by specifying the source address of the message, the destination address, and the type of message. The Presentation Header 152 identifies the data presentation rules and formats and is used to control interactive message flow versus file transfer work. Message data 154 is known as a self-defining message and is the actual application data portion of the message. In a self-defining message, each data element identifies itself with a unique type code and an element length code. There is no particular order in which the data elements need be placed in the message. No single application data element depends on any other element for its own identification.

The transport header 150 contains three fields. The TypeID field 156 identifies the type of Message. The destination address (DestAddr) 158 identifies the network address of the destination location. The source address (SrcAddr) 160 identifies the address of the source location; typically a cash register or ECR number. The Presentation Header 152 includes six fields: Format Version, Request-response Indicator, Transaction Code, Response Code, More Data Indicator, and End of Header Separator. Format Version field (VER) 162 identifies the message data layout rules to be used. Request-Response Indicator (RR) 166 is one character field which identifies a frame as a request or response frame. Transaction Code (TC) 168 contains codes which indicate the type of transaction involved. Response Code (RC) 170 is a two character field used to pass the reply status of a transaction and is used to provide error type indications. More fields (MF) 172 indicates when more data is to follow the current frame. In one embodiment, this field contains a one when another data frame is to follow. A zero indicates that no additional data is to follow. Transactions with different destination addresses can be interleaved within a more sequence. Field separator (FS) 174 is used to identify the end of the Transport header 150 and the Presentation header 152.

A CSI formatted frame is preceded by a frame-opening STX 177 which is the ASCII start-of-text character. The CSI format achieves data transparency by providing a frame length field 179 following the frame opening STX 177. The length indicator field 179 provides a byte count between the length indicator 179 and EXT 181 (the ASCII end-of-text character) and is representation of message length (headers plus message data). The length indicator 179 is used to locate the end of the frame independent of the contents of the frame data. The end of the frame includes an EXT 181 which is used as a length check plus a Longitudinal-Redundancy-Check character (LRC) 183. The LRC 183 is used to detect single bit errors and general failures on the otherwise nearly error free physical interface. The value of each bit in the LRC character 183, excluding the parity bit, is defined such that the total count of ONE bits encoded in the corresponding bit location of all characters of the data shall be even (this is also knows as an EXCLUSIVE OR (XOR) operation).

As stated above, one purpose of the CSI format 148 is to deliver data to a particular source in the network. The actual data passed back and forth through CS 4 is contained in the message data field 154 of FIG. 11. Message Data 154 contains the data field contents which are each identified by field identification and length fields. Using this self-defining message, fields can be sent in any order and can vary in size as appropriate to the applications involved.

Figure 12:
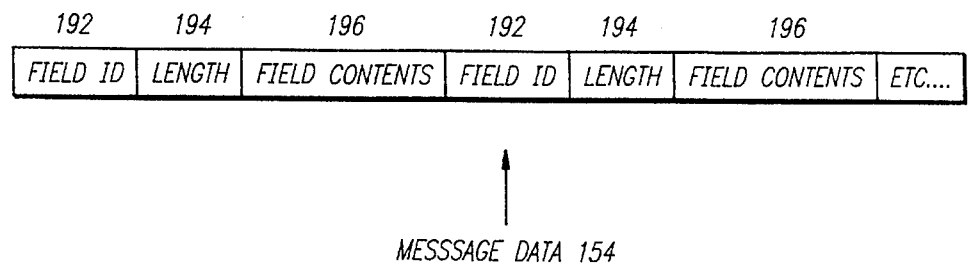
FIG. 12 depicts the message data format of the CSI.

The Message data 154 communicated between the Processor Controller 12 and CS 4 is formatted as shown in FIG. 12. The message data contains a plurality of records which include a Field ID 192 indicating the type of data, a Length Field 194 indicating the length of the data in bytes, and the Data Field contents 196. Both the Field ID 192 and a length field are one-byte binary fields, which results in only two bytes of overhead per data field 196.

In prior dial-up environments, the transport, presentation, flow control and link level layers of the protocol are tied to the premise that the end device is a dial terminal (in many dial-up specifications, these protocol layers may not be explicitly defined at all). Since dial terminals have a single user connotation, there is no provision in the protocol which would support the end device's ability to send another request before the previous response is received. This exchange is called single threading and is the typical dial terminal conversation.

In the present invention, the CS 4, the network provider 16 of FIG. 1, and the CSI message format 148 work together to support multi-leaved transaction flow, as described above. This is particularly valuable in stores where many ECRs are attached to the Processor Controller 12 and long waiting lines tend to develop during peak periods.

Referring again to FIGS. 2 and 11, when a sale is rung in at an ECR 10, Processor Controller 12 formats a CSI message which identifies the specific ECR 10 as the source point of an authorization request within the in-store network, and identifies a service provider network as the destination. This is accomplished through the three fields of the transport header 150: the Type ID field 156, the Destination Address field 158, and the Source Address field 160.

When a message is sent to CS 4, the message is handled by CSI module 46 which manipulates destination and source addresses. The CSI module 46 uses the contents of the TypeID field 56 to identify the type of destination address which indicates how the CSI module should parse the remaining fields of the message. For example, a presentation header 152 may or may not be present for some types of messages that are transmitted to, and from, a host computer. This is dependent on the requirements of the host (merchant or card processor). If the message is a type that does not have a presentation header 152, then the CSI module 46 does not need to parse the fields in the presentation header 152.

Once CSI module 46 determines the type of the message involved based on the value of TypeID 156, the CSI module 46 saves a copy of the message until a response is received or a time out occurs. The CSI module 46 sends the data to the destination indicated by the destination address 158 in the transport header 150. The destination address 158 identifies the entity to which the frame is to be delivered, such as Authorization Host 22 of FIG. 1. The value of the request destination address 158 becomes the value of the source address 160 when a response is subsequently sent by the destination to the source.

The destination address 158 is also used by CSI module 46 to determine the telephone number which the modem is to dial to establish communication with the Authorization network 8. The client profile downloaded from the Help desk 20 of FIG. 1 contains primary and secondary telephone numbers for various types of transactions based on the destination of the message. When a message is received by CSI module 46, the CSI module 46 determines the destination, and checks the status of the telephone line. If the line is already open, no action is taken and the message is sent to the Authorization network 8. If the line is not open then CSI module 46 executes a table look-up, finds the telephone number of the destination, and instructs the modem to dial that number. Once the communication is established, the message is transmitted.

Referring again to FIG. 1, when the message arrives at Authorization network 8, communications Processor 18 acts as a communication manager to route the message to its final destination. Communications processor 18 examines the destination address of the message, and performs a table look-up to determine the network route to the indicated address. Communication Processor 18 can only route messages to entities that are customers to the Authorization network 8. For example, when a message is sent to Communication processor 18 identifying CDC 24 as a destination, Communications processor 18 looks for CDC 24 in a table, finds a corresponding address, and routes the message to that address. If a merchant desires access to an entity, such as Host computer 28, through Communication processor 18, then Host 26 must become a customer in the network 8.

Referring to FIG. 11, source address 60 contains the address for the entity which is the source of the request transaction and often will be the register number or ECR 10 of FIG. 2. The value of the source address 60 in the request frame is returned as the value of the destination address 58 when a response is subsequently sent by the destination to the source. Processor Controller 12 uses the value in the destination address 158 to determine which cash register or ECR 10 in which to return the response data.

Using the CSI message format 148, financial data and non-financial data are interleaved and passed to and from CS 4 independently. For example, a packet of data may be sent to the CS 4 that contains the destination address of the Authorization Host 22, while the next packet is a request to the merchant Host computer 28 for an inventory or some other file. During this same time frame, CS 4 may be receiving a response back from credit authorization request, and so on. All the messages are independent of each other and interleaved so that as a message is returned, it is delivered to the requesting source regardless of the order in which the request was sent.

In the past, only authorization requests were interleaved on the same phone line in the dial-up environment. CS 4 interleaves both authorization requests and the non-financial data on the same phone line which is more efficient. In between an authorization transaction, CS 4 can upload payroll information, for instance, saving the merchant processing and communication time.

With the layered message format architecture shown in FIGS. 11 and 12, virtually any set of application requirements from RIS 6 of FIG. 1 can be accommodated over the single link to CS 4 simultaneously. The CSI format used between the Message software module 52 and the CSI message software module 46 eliminates the need to implement both transaction card processing and administrative functions required to accept transaction card payments into Processor Controller applications.

More importantly, the CSI format 148 provides a stable interface which isolates the ISP application from many of the changes in both processing rules and data requirements implemented by an electronic payment processor, such as VISA for example. A merchant that uses the CS 4 system to connect to an Authorization network 8 and utilizes the CSI format 148, is protected from having to modify Processor Controller 12 software to respond to the service processor's periodically revised POS requirements.

The CS 4 has the ability to positively determine whether all the data elements required for a given transaction are present in the request sent by the Processor Controller 12. Therefore, as long as the merchant is not required to supply additional data to accompany sales information, such as magnetic stripe data where none was passed before, there should be no need to change the software of the Processor controller 12. As an example, in a debit card scenario, the Processor controller 12 may not recognize that payment with a particular type of card requires personal identification number (PIN) entry. The CS 4 would then prompt the Processor controller 12 for the additional data (the PIN) before sending the transaction on to the Authorization network 8 for processing.

According to the aspects of the present invention, to the Processor Controller 12, the CS 4 appears to be a leased-line authorization host with optional host-capture capability, and with a simplified and stable protocol and record format (as compared to, for example, VISA 2 dial standards). To the Authorization network 8, the CS 4 appears to be a dial-up authorization/capture terminal, but with the ability to use synchronous/SDLC protocol, and multi-leaved financial and non-financial messages.

Because software modules are downloadable to CS 4, CS 4 is able to take advantage of changes to the telecommunication access methods 14 to the Authorization network 8 while insulating the RIS 8 from those changes. Regardless of the communications access method 14 selected for a given store (i.e ISDN, satellite), the interface of RIS 6 to CS 4 will not change. Merchants manage Message Software Module 52 of FIG. 2 within Processor Controller 12 while CS 4 handles network management, failure recognition, error detection, error correction, redialing backup numbers, timeout handling, alternate routing, message formatting (Visa 2, for example), and batch management.

Hardware Indicator and Controls

Figure 13:
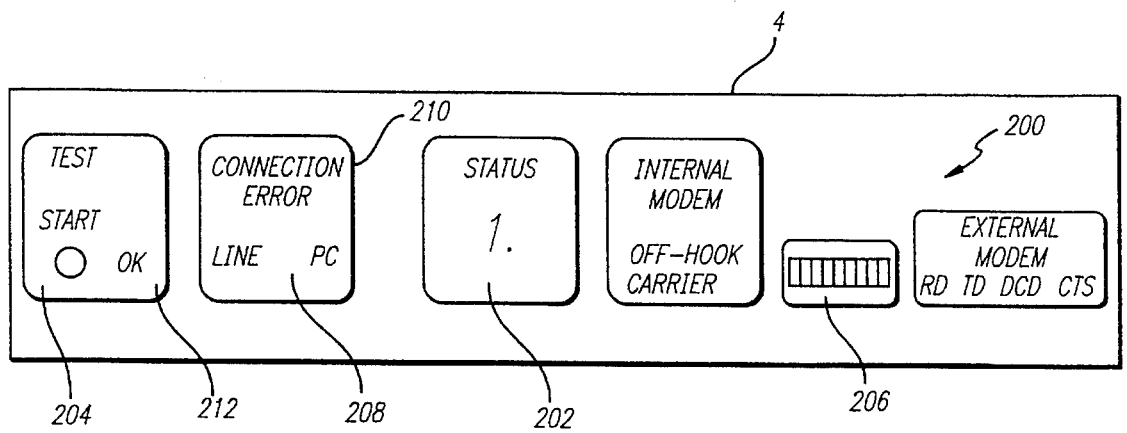
FIG. 13 depicts the front panel of the Communication System.

In a preferred embodiment, the software modules of CS 4 reside in a commercially available hardware platform from Hypercom, Inc. known as MiniNAC-1V. FIG. 13 depicts the front panel of CS 4. The front panel 200 of CS 4 contains a single-digit display 202 with decimal point, a recessed pushbutton switch 204, an 8-pole DIP switch 206, and various LED indicator lights discussed below.

The decimal point of the seven-segment display 202 is made to blink on-and-off continuously by CS 4 software as an indication that the software is functioning properly. The decimal point blinks approximately once per second when CS 4 is executing its normal application software, approximately two blinks per second when executing a ROM loader, and approximately five blinks per second during a power-fail-restart sequence. Display 202 is used to indicate the current status of CS 4. For example, a "2" indicates that CS 4 is on-line with the Authorization host 22 of FIG. 1 and during downline load, the display 202 indicates what memory bank is presently being loaded.

In a one preferred embodiment, the front-panel pushbutton switch 204 is marked TEST START and may be depressed by inserting a penpoint or similar pointed object through an access hole in the front panel. The switch 204 is used by CS 4 software for three different functions:

In the first function, during normal CS 4 operation, if the front-panel pushbutton switch 204 is depressed briefly, an Authorization network test transaction is initiated, described below. In the second function, when the front-panel pushbutton switch 204 is depressed immediately after power-up and held until acknowledged by a beep (approximately one second), a software reset (warm start) is initiated. This may cause queued transactions in CS 4 memory to be lost, but it does not clear the batch. This software reset function is provided in the event that the CS 4's normal power-fail-restart (which preserves in-process transactions) fails to work properly. (A warm start can also be initiated remotely by Help Desk 20).

In the third function, when the front-panel pushbutton switch 204 is held depressed as CS 4 is powered up, CS 4 transfers control to an EPROM loader and awaits a software down-line load from the Help Desk 20 (boot). The status display 202 changes to "L" while CS 4 is waiting for a down-line load, and displays the memory bank being loaded while a down-line load is in progress. (A boot can also be initiated remotely by Help Desk 20.)

Test and Diagnostic Functions

Referring again to FIG. 1, in the event that card processing stops functioning properly, CS 4 includes test and diagnostic facilities that simplify the merchant's determination whether the problem lies in ISP system 8, the CS 4, or the in the access communications method 14 to Authorization network 8.

As shown in FIG. 13, CS 4 includes a LINE PROBLEM indicator light 208, a PC PROBLEM indicator light 210, and a TEST OK indicator light 212. When CS 4 attempts to dial the primary and secondary telephone numbers for Authorization network 8, but is unable to establish a dial-up connection, CS 4 automatically illuminates the red LINE PROBLEM indicator light 208. The red LINE PROBLEM indicator light 208 also illuminates when a self-test fails. When CS 4 attempts communication with Processor controller 12 of FIG. 1 and receives no acknowledgement from Processor Controller 12 after a set number of retries, CS 4 automatically illuminates the red PC PROBLEM indicator light 210. Once illuminated, the error indicator lights remain illuminated until reset by a local or remote software reset command, or until the recessed TEST START pushbutton switch 204 on CS 4 is pressed.

The retailer may also initiate the test and diagnostic functions of CS 4. If the retailer briefly depresses the TEST START pushbutton switch 204 during normal operations, CS 4 initiates a Authorization network test transaction. CS 4 first extinguishes the green TEST OK light 212 and the red LINE PROBLEM and PC PROBLEM indicator lights 208 and 210, respectively. CS 4 then establishes a dial-up connection with Authorization Host 22 of FIG. 1 (unless it is already on-line to the host), transmits a test transaction to the Host 22, and awaits a response. If no other transactions are queued, CS 4 disconnects from Host 22 after a preset hang-up-delay period. If the test is successful, CS 4 illuminates the green TEST OK indicator light 212 to indicate that a response was received from Authorization Host 22. If the test is unsuccessful, then CS 4 illuminates the red LINE PROBLEM light 208 after a preset number of seconds.

In addition, CS 4 also includes standard modem indicator lights such as "offhook", "carrier", and so on, which are well-known and not discussed here. Using the error indicators, retailers are able to determine if errors are occurring in the CS 4 or at a location remote from CS 4.

An adaptive communication interface system has been described herein which achieves the following: 1) eliminates the need for future modifications to the merchant's processor software because of changes in both local access techniques and changes to point-of-sale compliance requirements, thus eliminating the need for merchant re-certification; 2) provides faster response to authorization requests than what can normally be achieved using dial-up methods through fast connection techniques including pre-dial, fast pulse dialing, modem fast-train, Feature Group B, and interleaving; 3) allows a card processor to provide a dial-up help desk facility for remote problem analysis, performance tracking and reporting through an event log parameter and software down-line load and modification; 4) provides an improved method for draft capture in a multi-processor environment; and 5) supports direct communications between a Processor Controller and a merchant's host computer.

The foregoing descriptions of specific embodiments of the present invention have been presented for purposes of illustration and description. They are not intended to be exhaustive or to limit the invention to the precise forms disclosed, and it should be understood that many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

I claim:

1. A system for transferring data between a retail information system and a transaction card processor through an authorization network, said retail information system having a plurality of processing devices linked to a processor controller, said processor controller executing a particular software application, said transaction card processor having responsibility for network services including network access methods and point of sale compliance requirements, said system comprising:

communication means for controlling said transfer of data between said processor controller and said authorization network, said data transferred between said retail information system and said transaction card processor including financial data messages and non-financial data messages, said communication means including;

means for communicating with said processor controller;

means for processing and transferring said financial data messages concurrently with said non-financial data messages;

means for establishing communication with said authorization network through a dial-up telephone connection; and means for insulating said retail information system from changes to said network access methods, and from changes to said point of sale compliance requirements, independent of said particular software application executing on said processor controller.

2. A system as in claim 1, wherein said communication means includes means for establishing a dial-up telephone connection to a host computer for communication between said processor controller and said host computer.

3. A system as in claim 1, wherein said communication means further includes means for multi-trans message data flow.

4. A system as in claim 3, wherein said communication means further includes means for multi-leaved message data flow.

5. A system as in claim 4, wherein said means for establishing communication includes means for providing response times in a dial-up environment that are substantially equal to response times provided in a leased line environment.

6. A system as in claim 5, wherein said means for establishing communication further includes predial means.

7. A system as in claim 6, wherein said means for establishing communication further includes rapid dial means.

8. A system as in claim 7, wherein said means for establishing communication further includes fast modem handshaking means.

9. A system as in claim 1, wherein said communication means further includes means for communicating with a remote help desk facility, said remote help desk facility comprising:

means to submit financial transactions to said communication means for transmission to said authorization network for performance monitoring; and means to download software and parameters to said communication means.

10. A system as in claim 9, wherein said communication means further includes means for storing service quality data independent of said particular software application executing on said processor controller for diagnostic and performance reporting; and said help desk facility further includes means to interrogate said service quality data of said communication means.

11. A system as in claim 1, wherein said communication means further includes draft capture means for maintaining multiple capture groups and multiple settlement batches concurrently.

12. A system as in claim 11, wherein said retail information system includes an administrative terminal, said communication means further including means for communicating with said administrative terminal for reviewing, adjusting, and releasing said multiple settlement batches independently.

13. A system as in claim 1, wherein said means for communicating with said processor controller and means for insulating includes a communication system interface message format.

14. In a transaction card processor authorization network including a retail information system having a plurality of processing devices linked to a processor controller, said transaction card processor having responsibility for network services including network access methods and point of sale communication requirements, a communication apparatus comprising:

means for communicating with said processor controller;

means for establishing communication with said authorization network through a dial-up telephone connection;

means for communicating with a remote help desk facility;

means for maintaining drafts, groups and multiple settlement batches;

means for communicating to a host computer for communication between said processor controller and said host computer; and means for transferring data between said processor controller and said authorization network including means for isolating said retail information system from changes to said network access methods and from changes to said point of sale compliance requirements made by said transaction card processor.

15. A communication apparatus as in claim 14, wherein said retail information system includes an administrative terminal, said communication apparatus further including means for communicating with said administrative terminal for reviewing, adjusting, and releasing said multiple settlement batches independently.

16. A communication apparatus as in claim 14, wherein said processor controller executes a particular software application, said communication apparatus further including means for storing service quality data for diagnostic and performance reporting, independent of said particular software application executing on said processor controller.

17. A communication apparatus as in claim 14, wherein said data includes financial data messages and non-financial data messages.

18. A system as in claim 17, wherein said communication means further includes means for multi-trans message data flow.

19. A system as in claim 18, wherein said communication means further includes means for multi-leaved message data flow in a dial-up environment.

20. A method of providing improved communication services between a retail information system and a transaction card processor authorization network using a communication apparatus which insulates said retail information system from changes to network access methods and from changes to point of sale compliance requirements chosen by said transaction card processor, said communication apparatus providing said retail information system improved authorization response time and diagnostic capability, said method comprising said steps of:

connecting said communication apparatus to said retail information system and to said authorization network;

establishing a first dial-up connection between said communication apparatus and said transaction card network; and interleaving financial data messages and non-financial data messages between said retail information system and said authorization network over said first dial-up connection by said communication apparatus.

21. A method as in claim 20, including the step of maintaining capture draft data in said communication apparatus and creating multiple settlement batches which can be independently reviewed, adjusted, and released.

22. A method as in claim 20, including the step of establishing a second dial-up telephone connection from said communication apparatus to a host computer for communication between said processor controller and said host computer.

23. A method as in claim 20, including the step of storing service quality data in said communication apparatus for diagnostic and performance reporting.

* * * * *

UNITED STATES PATENT AND TRADEMARK OFFICE
CERTIFICATE OF CORRECTION

PATENT NO. : 5,526,409
DATED : June 11, 1996
INVENTOR(S) : Conrow et al.

It is certified that error appears in the above-identified patent and that said Letters Patent is hereby corrected as shown below:

In Column 4, line 53, change "service,," to --service,--.
In Column 6, line 29, change "42" to --46--.
In Column 9, line 66, change "increments." to --increments--.
In Column 11, line 47, change "capture approximately" to --capture of approximately--.
In Columm 13, line 20, change "drafts the" to --drafts to the--; and
                line 23, change "allows" to --allow--.
In Column 18, line 23, change "knows" to --known--; and
                line 64, change "Type ID" to --TypeID--.
In Column 19, line 2, change "TypeID field 56" to --TypeID field 156--.
In Column 20, line 61, change "i.e" to --i.e.--.
In Column 21, line 39, change ")." to --.)--.

Signed and Sealed this

Eleventh Day of February, 1997

Attest:

BRUCE LEHMAN

Attesting Officer      Commissioner of Patents and Trademarks